United States Patent
Qi

(10) Patent No.: US 11,692,063 B2
(45) Date of Patent: *Jul. 4, 2023

(54) FILAMENT COMPOSITIONS FOR FUSED FILAMENT FABRICATION AND METHODS OF USE THEREOF

(71) Applicant: DuPont Polymers, Inc., Wilmington, DE (US)

(72) Inventor: Kai Qi, Wilmington, DE (US)

(73) Assignee: DuPont Polymers, Inc., Wilmington, DE (US)

( * ) Notice: Subject to any disclaimer, the term of this patent is extended or adjusted under 35 U.S.C. 154(b) by 777 days.

This patent is subject to a terminal disclaimer.

(21) Appl. No.: 16/340,762

(22) PCT Filed: Oct. 12, 2017

(86) PCT No.: PCT/US2017/056256
§ 371 (c)(1),
(2) Date: Apr. 10, 2019

(87) PCT Pub. No.: WO2018/075319
PCT Pub. Date: Apr. 26, 2018

(65) Prior Publication Data
US 2020/0048414 A1    Feb. 13, 2020

Related U.S. Application Data

(60) Provisional application No. 62/411,054, filed on Oct. 21, 2016.

(51) Int. Cl.
| | |
|---|---|
| *C08G 69/26* | (2006.01) |
| *C08L 77/00* | (2006.01) |
| *C08L 77/06* | (2006.01) |
| *B29C 64/118* | (2017.01) |
| *B33Y 70/00* | (2020.01) |
| *D01F 6/90* | (2006.01) |
| *B33Y 80/00* | (2015.01) |
| *B29K 77/00* | (2006.01) |

(52) U.S. Cl.
CPC .......... *C08G 69/265* (2013.01); *B29C 64/118* (2017.08); *B33Y 70/00* (2014.12); *C08L 77/00* (2013.01); *C08L 77/06* (2013.01); *D01F 6/90* (2013.01); *B29K 2077/10* (2013.01); *B33Y 80/00* (2014.12); *D01F 6/905* (2013.01)

(58) Field of Classification Search
CPC .... C08L 77/06; C08L 77/10; D01F 6/90–905; B29C 64/00–40
See application file for complete search history.

(56) References Cited

U.S. PATENT DOCUMENTS

| 5,391,640 A | 2/1995 | Akkapeddi et al. |
|---|---|---|
| 2004/0030023 A1 | 2/2004 | Buhler et al. |
| 2013/0022786 A1* | 1/2013 | Topoulos ............... C08K 7/14 428/141 |
| 2014/0141166 A1 | 5/2014 | Rodgers |
| 2015/0145168 A1 | 5/2015 | Rodgers et al. |

FOREIGN PATENT DOCUMENTS

| CA | 2015999 A1 | 11/1990 |
|---|---|---|
| EP | 3529018 A1 | 8/2019 |
| JP | 2019-534393 A | 11/2019 |
| WO | 2018/075319 A1 | 4/2018 |

OTHER PUBLICATIONS

International Search Report in International Application No. PCT/US2017/056256, dated Jan. 22, 2018.

* cited by examiner

*Primary Examiner* — Ana L. Woodward
(74) *Attorney, Agent, or Firm* — Dority & Manning, P.A.

(57) ABSTRACT

The disclosure generally relates to filaments and in particular, filaments for use in fused filament fabrication to prepare 3D printed articles. The filaments may be prepared from a polymer composition comprising: A) 55 to 95 weight percent semi-aromatic copolyamide having a melting point; and B) 5 to 45 weight percent amorphous copolyamide having a melting point.

11 Claims, No Drawings

FILAMENT COMPOSITIONS FOR FUSED FILAMENT FABRICATION AND METHODS OF USE THEREOF

CROSS-REFERENCES TO RELATED APPLICATIONS

This application claims priority under 35 U.S.C. §§ 365 and 371 to International Application No. PCT/US2017/056256, filed on Oct. 12, 2017, which in turn claims priority to U.S. Provisional Appln. No. 62/411,054, filed on Oct. 21, 2016, each of which is incorporated herein by reference in its entirety.

OVERVIEW

Disclosed herein are polymer compositions of use in preparing filaments, the use of such filaments in fused fabrication processes, and articles prepared by such processes.

Fused filament fabrication, also known as additive manufacturing or 3-dimensional printing (3D printing), is a process by which successive layers of a composition are deposited and fused to produce an article having a defined shape. By "fused" is meant that the successive layers adhere to one another, i.e., the fused article has a useful level of mechanical strength.

Fused filament fabrication (FFF) is a specific type of fused fabrication process in which the material enters the 3D printing device controlling the layer-by-layer deposition as a filament, fiber, or strand. The filament may have any cross sectional geometry or size, provided it enters the deposition device in a substantially continuous form. Fused filament fabrication simplifies material handling and compaction of material to be deposited compared to using pellets or powders.

Thermoplastics to be used in filaments for FFF face a number of conflicting requirements. They must flow easily during deposition in order to form the article and adhere to the layer previously deposited, but substantially cease flowing thereafter to prevent sagging and distortion of the printed article. Thermoplastics with high melting peak temperatures like polyamides, polyoxymethylene, or polyesters have desirable properties for finished articles, but their crystallization rates upon cooling adversely affects inter-layer adhesion and induces shrinkage that may distort the article as it is printed. Lower crystallinity polymers like ethylene copolymers, thermoplastic polyurethanes, and co-polyesters may be readily processed by FFF, but the articles from these polymers lack stiffness. Adding conventional inorganic fillers such as talc, silica, TiO2, or CaCO3 to increase stiffness of such polymers increases the density of the filament and the printed article. With each successive layer deposited, the weight of the article increases, placing more stress on the article as it is printed, potentially causing distortion. Fillers may induce additional anisotropic shrinkage which further aggravate the warpage. Furthermore, at high volume fractions, these fillers can produce articles that are brittle or the filaments may cause abrasive wear to the printing equipment.

U.S. Patent applications 2014/0141166 A1 and 2015/0145168 disclose compositions for fused filament fabrication comprising at least one semi-crystalline polyamide and at least one amorphous polyamide.

U.S. Pat. No. 5,391,640 discloses a blend of a conventional polyamide and an amorphous polyamide wherein such blends are relatively insensitive to humidity and exhibit good film barrier properties.

There is a need, therefore, for improved polymer compositions of filaments comprising semi-crystalline thermoplastics for fused filament fabrication, and methods for processing these filaments via fused filament fabrication.

DETAILED DESCRIPTION OF THE INVENTION

Abbreviations

The claims and description herein are to be interpreted using the abbreviations and definitions set forth below.
"MI" refers to Melt Index.
"MPa" refers to megapascal.
"psi" refers to pounds per square inch.
"%" refers to the term percent.
"wt. %" refers to weight percent.
"mol. %" refers to mole percent.
"IV" refers to inherent viscosity.
"RV" refers to relative viscosity.

Definitions

As used herein, the article "a" refers to one as well as more than one and does not necessarily limit its referent noun to the grammatical category of singular number.

As used herein, the terms "about" and "at or about", when used to modify an amount or value, refers to an approximation of an amount or value that is more or less than the precise amount or value recited in the claims or described herein. The precise value of the approximation is determined by what one of skill in the art would recognize as an appropriate approximation to the precise value. As used herein, the term conveys that similar values, not precisely recited in the claims or described herein, can bring about results or effects that are equivalent to those recited in the claims or described herein, for which one of skill in the art would acknowledge as acceptably brought about by the similar values.

As used herein, the term "article" refers to an unfinished or finished item, thing, object, or an element or feature of an unfinished or finished item, thing or object. As used herein, when an article is unfinished, the term "article" may refer to any item, thing, object, element, device, etc. that has a form, shape, configuration that may undergo further processing in order to become a finished article. When an article is finished, the term "article" refers to an item, thing, object, element, device, etc. that is in a form, shape, configuration that is suitable for a particular use/purpose without further processing of the entire entity or a portion of it.

An article may comprise one or more element(s) or subassembly(ies) that either are partially finished and awaiting further processing or assembly with other elements/subassemblies that together will comprise a finished article. In addition, as used herein, the term "article" may refer to a system or configuration of articles.

As used herein, terms that describe molecules or polymers follow the terminology in the IUPAC Compendium of Chemical Terminology version 2.15 (International Union of Pure and Applied Chemistry) of Sep. 7, 2009.

Ranges and Preferred Variants

Any range set forth herein expressly includes its endpoints unless explicitly stated otherwise. Setting forth an amount, concentration, or other value or parameter as a range specifically discloses all possible ranges formed from any possible upper range limit and any possible lower range limit, regardless of whether such pairs of upper and lower range limits are expressly disclosed herein. Polymer compositions, compounds, processes and articles described herein are not limited to specific values disclosed in defining a range in the description.

The disclosure herein of any variation in terms of materials, chemical entities, methods, steps, values, and/or ranges, etc.—whether identified as preferred or not—of the processes, polymer compositions, compounds, mixtures, and articles described herein specifically intends to include any possible combination of materials, methods, steps, values, ranges, etc.

In this description, if there are nomenclature errors or typographical errors regarding the chemical name any chemical species described herein, including curing agents of formula (I), the chemical structure takes precedence over the chemical name. And, if there are errors in the chemical structures of any chemical species described herein, the chemical structure of the chemical species that one of skill in the art understands the description to intend prevails.

Generally

Disclosed herein are filaments for fused filament fabrication of articles, said filament comprising a polymer composition, said polymer composition comprising:
A) 55 to 95 weight percent semi-aromatic copolyamide having a melting point; wherein said semi-aromatic copolyamide comprises
  a-1) 5 to 40 mole percent aromatic repeat units derived from:
    i) one or more aromatic dicarboxylic acids with 8 to 20 carbon atoms and an aliphatic diamine with 4 to 20 carbon atoms; and
  a-2) 60 to 95 mole percent aliphatic repeat units derived from:
    ii) an aliphatic dicarboxylic acid with 6 to 20 carbon atoms and an aliphatic diamine with 4 to 20 carbon atoms; and
B) 5 to 45 weight percent amorphous copolyamide; wherein said amorphous copolyamide comprises
  b-1) 60 to 90 mole percent aromatic repeat units derived from:
    iii) isophthalic acid and an aliphatic diamine with 4 to 20 carbon atoms; and
  b-2) 10 to 40 mole percent aromatic repeat units derived from:
    iv) terephthalic acid and an aliphatic diamine with 4 to 20 carbon atoms.

Also disclosed herein are articles prepared from filaments disclosed herein using fused filament fabrication processes. Further disclosed herein are processes for producing a filament for fused filament fabrication.

Specifically, disclosed herein are filaments for use in fused filament fabrication processes, said filaments comprising a polymer composition, said polymer composition comprising a mixture of at least one semi-crystalline copolyamide and at least one amorphous copolyamide. The semi-crystalline copolyamide comprises about 55 wt. % to 95 wt. %, preferably 70 wt. % to 90 wt. %, and most preferably 70 wt. % to 80 wt. % of the polymer composition based on the sum of the weights of semi-crystalline copolyamide and amorphous copolyamide in the polymer composition. The amorphous copolyamide comprises 5 wt. % to 45 wt. %, preferably 10 wt. % to 30 wt. %, and most preferably 20 wt. % to 30 wt. % of the copolyamide mixture based on the sum of the weights of semi-crystalline copolyamide and amorphous copolyamide in the polymer composition.

Articles prepared from filaments comprising the polymer compositions disclosed herein using fused filament fabrication processes exhibit lower warpage, less distortion, and desirable printability upon cooling compared to articles prepared using polymer compositions which comprise only a semi-crystalline copolyamide or only an amorphous copolyamide.

Semi-Crystalline Copolyamide

The semi-crystalline copolyamide used in the polymer compositions described herein to prepare filaments is a copolyamide having two or more amide and/or diamide molecular repeat units. For copolyamides disclosed herein, the repeat units are listed in decreasing order of mole % repeat units present in the copolyamide. The following list exemplifies the abbreviations used to identify monomers and repeat units in the copolyamides (PA):

HMD hexamethylene diamine (or 6 when used in combination with a diacid)
T Terephthalic acid
AA Adipic acid
DMD Decamethylenediamine
DDA Decanedioic acid
DDDA Dodecanedioic acid
I Isophthalic acid
TMD 1,4-tetramethylene diamine
4T polymer repeat unit formed from TMD and T
6T polymer repeat unit formed from HMD and T
6I polymer repeat unit formed from HMD and I
66 polymer repeat unit formed from HMD and AA
10T polymer repeat unit formed from DMD and T
410 polymer repeat unit formed from TMD and DDA
510 polymer repeat unit formed from 1,5-pentanediamine and DDA
610 polymer repeat unit formed from HMD and DDA
612 polymer repeat unit formed from HMD and DDDA Note that in the art the term "6" when used in combination with a diacid such as T, for instance 6T, the "6" refers to HMD. In repeat units comprising a diamine and diacid, the diamine is designated first. Copolymer repeat units are separated by a slash (that is, /). For instance poly(hexamethylene dodecanediamide/hexamethylene terephthalamide) is abbreviated PA612/6T (75/25), and the values in brackets are the mole % repeat unit of each repeat unit in the copolymer.

The aromatic dicarboxylic acid with 8 to 20 carbon atoms include terephthalic acid, isophthalic acid, and 2,6-napthalenedioic acid. Terephthalic acid and isophthalic acid are preferred, with terephthalic acid most preferred.

The aliphatic dicarboxylic acid with 6 to 20 carbon atoms may include adipic acid, decanedioic acid, dodecanedioic acid, tridecanedioic acid, tetradecanedioic acid, hexadecanedioic acid, octadecanedioic acid. Dodecanedioic acid, decanedioic acid, hexadecanedioic acid, and octadecanedioic acid are preferred aliphatic dicarboxylic acids, with dodecanedioic acid and decanedioic acid being most preferred.

The aliphatic diamine with 4 to 20 carbon atoms may include hexamethylenediamine (HMD), 1,10-decanediamine, 1,12-dodecanediamine, and 2-methyl-1,5-pentamentylenediamine with hexamethylenediamine being preferred.

Non-limiting examples of semi-crystalline copolyamides useful in the polymer compositions include those selected from the group consisting of: PA 66/6T (95/5) to (60/40), and preferably PA 66/6T (90/10) to (70/30), and most preferably PA 66/6T (85/15) to (75/25); PA 612/6T (95/5) to (60/40), and preferably PA 612/6T (90/10) to (70/30), and most preferably PA 612/6T (85/15) to (75/25); PA 610/6T (95/5) to (60/40), and preferably PA 610/6T (90/10) to (70/30), and most preferably PA 610/6T (85/15) to (75/25); PA 616/6T (95/5) to (60/40), and preferably PA 616/6T (90/10) to (70/30), and most preferably PA 616/6T (85/15) to (75/25); and PA 618/6T (95/5) to (60/40), and preferably PA 618/6T (90/10) to (70/30), and most preferably PA 618/6T (85/15) to (75/25).

Amorphous Copolyamide

The amorphous copolyamide used in the polymer compositions described herein to prepare filaments is a copolyamide having two or more amide and/or diamide molecular repeat units in which one repeat unit comprises terephthalic acid and the second repeat unit comprises isophthalic acid.

The diamine which may be used to prepare the amorphous copolyamide includes linear, branched, or cyclic aliphatic diamines with 4 to 20 carbon atoms. Examples of suitable diamines include hexamethylenediamine (HMD), 1,10-decanediamine, 1,12-dodecanediamine, 1,4-cyclohexanediamine, and 2-methyl-1,5-pentamentylenediamine with hexamethylenediamine being preferred.

Non-limiting examples of amorphous copolyamides useful in the polymer compositions include those selected from the group consisting of: PA 6I/6T (60/40) to (95/5), and preferably PA 6I/6T (70/30) to (80/20).

The weight ratio of semi-crystalline copolyamide to amorphous copolyamide in the polymer composition ranges from about 55:45 to 95:5, preferably 60:40 to 90:10, and more preferably from 70:30 to 90:10.

It has surprisingly been found that filaments prepared from polymer compositions comprising a semi-crystalline copolyamide having a specific molar ratio of certain repeat units in combination with an amorphous copolyamide having a specific molar ratio of certain repeat units, and wherein the weight ratio of the semi-crystalline copolyamide to amorphous copolyamide is within a defined range, provide 3D printed articles which exhibit desirable relative strength and warpage properties.

Additives

The polymer compositions may optionally comprise additional additives such as plasticizers, colorants; lubricants; antioxidants, and heat stabilizers. Such additives can be added according to the desired properties of the resulting material, and the control of these amounts versus the desired properties is within the knowledge of the skilled artisan.

Process for Preparing Polymer Compositions

The polymer compositions may be produced by feeding the semi-crystalline copolyamide and amorphous copolyamide, and optionally other additives, into a device designed to mix molten thermoplastic polymers such as a single or twin screw extruder, Banbury® mixer, Farrel Continuous Mixer (FCM™), or a two-roll mill. The copolyamides are fed into the mixing device where they are melted, mixed, cooled, and if desired, pelletizing or granulating the cooled polymer composition to produce a polymer composition for use in making filaments. Such processes are well known in the art.

Process for Producing Filaments

The filament, strand, or fiber for use in a fused fabrication process may be formed by any method known in the art. For example, filaments disclosed herein may be prepared by the following process steps:
1) Pellets of the polymer composition comprising semi-crystalline copolyamide and amorphous copolyamide are fed into an extruder in which the temperature in the extruder is sufficient to melt the polymer composition to form a melt mixture;
2) extruding the melt mixture through a die and cooling the mixture to form a filament.

Alternatively, filaments disclosed herein may be prepared by the following process steps:
1) mixing at least one semi-crystalline copolyamide and at least one amorphous copolyamide, and optionally, additional additives, at a temperature sufficient to form a melt mixture;
2) extruding the melt mixture through a die and cooling the mixture to form a filament.

Process for Producing Articles

The polymer compositions described herein may be used to prepare filaments, fibers, and strands for producing articles by fused filament fabrication processes. These filaments allow articles to be prepared using 3-dimensional printing techniques wherein the articles comprise high melting thermoplastic polymers. Such articles exhibit desirable properties such as reduced warpage, superior printing capability, high dimensional accuracy, and improved surface appearance compared to articles produced by filaments from polymer compositions comprising either semi-crystalline copolyamides or amorphous copolyamides alone.

Fused filament fabrication is a process commonly used to prepare articles from filaments. Generally, in fused filament fabrication, a filament, comprising the polymer composition disclosed herein, is fed through a heated die or nozzle wherein the temperature of the die is sufficiently high to melt the filament. The molten filament exits the die and is deposited in a layer-by-layer fashion to form the desired article. Control of deposition rate may be varied by altering the filament feed rate, filament cross sectional dimensions, and the rate of motion of the die head and/or article.

It is known in the art that the bed temperature, nozzle temperature, and other parameters used during preparation of 3D printed articles may have an effect on the properties of the 3D printed article. Therefore, comparison of physical properties of 3D printed articles disclosed herein were performed using identical printing conditions of the samples prepared for testing.

More specifically, articles disclosed herein may be prepared by the following process steps:
1) feeding a filament comprising the polymer composition through a heated die at a temperature sufficient to form a polymer melt;
2) depositing the polymer melt in a layer-by-layer fashion to form the desired article.

Examples

The exemplary compounds identified by "E" in the tables below are intended only to further illuminate and not to limit the scope of compounds, processes, and articles described and recited herein. Comparative examples are identified in the tables below by "C".

Materials

PA1 PA 612/6T (75/25) having an inherent viscosity of 1.20-1.35 dl/g available from DuPont.
PA2 PA 612/6T (85/15) having an inherent viscosity of 1.25-1.40 dl/g available from DuPont.
PA3 PA 610/6T (80/20) having an inherent viscosity of 1.25-1.40 dl/g available from DuPont.
PA4 PA 6I/6T (70/30) having an inherent viscosity of 0.79-0.85 dl/g available from DuPont.

PA5 PA 6I/6T (70/30) having an inherent viscosity of 0.68-0.75 dl/g available from DuPont.

PA6 PA 66/6T (85/25) having a relative viscosity of 37-45 available from DuPont.

Test Methods

Tensile strength, tensile modulus, and strain at break were measured following ISO 527-2:2012 using type 5A test bars at a strain rate of 5 mm/min. Testing bars were printed by FFF process and were conditioned at 23° C. at 50% RH for at least 40 h before being tested for the test bars in Tables 1 and 2. For the test bars used in Tables 3 and 4, the test bars were tested "dry as printed" without any conditioning. Samples that are "dry as printed", were printed under a nitrogen environment, and the printed bars were kept under nitrogen before being sealed in aluminum bags under vacuum before being tested.

Relative strength (RS) is the product of tensile strength and strain at break as defined by the following equation:

$$RS = (\text{tensile strength}) \times (\%\text{ elongation at break}/100)$$

Heat deflection temperature (HDT) values were determined according to ISO 75-2:2013 method B, using a flexural stress of 66 psi (0.45 MPa). Testing bars were printed by FFF process and conditioned at 23° C. at 50% RH for at least 40 h before being tested, for the test bars in Tables 1 and 2. For the test bars used in Table 3 and 4, the test bars were tested "dry as printed" without any conditioning.

Curl Bar Test: This test was adapted from US20140141166 A1 and is used to measure the amount of curl in a 3D printed test sample. Printing of the test samples is performed in a layer-by-layer manner using an extrusion-based additive manufacturing system 3ntr A4v3, commercially available from 3ntr (Oleggio, Italy) and from Plural AM (Portland, Oreg.), where a filament comprising ionomer (A) and having an average nominal diameter of 2.85 mm is used. The test involves treating the entire bed of the 3D printer with a sheet of polyether imide (PEI), commercially available from Aleph Objects, Inc. (Loveland, Colo.; Lulzbot® TAZ PEI sheet; part number 817752016438), and then printing a test bar from tool path instructions to have a 270 mm length, a 10 mm width, and a 10 mm vertical height using the following printer settings: 0.4 mm nozzle, 0.25 mm layer height, 100% 45/–45 degree infill, 1 shell, 2.85 mm filament diameter, and 100% flow. The nozzle and bed temperatures, printing speed, and cooling can be adjusted according to the material being printed. Herein for nylon, a nozzle temperature of 240-290° C., a bed temperature of 25-110° C. and a printing speed of 30 mm/sec were used, unless specified otherwise, and the cooling fan was turned off. A light layer of glue stick (Elmer's Washable Glue Stick) was applied prior to printing. After the test bar was printed, it was removed from the system and measured for curl at room temperature (25° C.). The curl of the material manifests itself by the ends of the test bar curling up, such that the test bar will bow or curl. The curl measurement involves identifying a line that connects the ends of test bar in the longest dimension and locating the midpoint along the length of the test bar between these ends. The amount of curl is then measured as the height of the displacement of the ends of the test bar measured from the line between the two ends of the test bar to the surface of the test bar at the midpoint. This height of the displacement may be measured with a micrometer and recorded in mm. In other words, a line is drawn between the edge of the two ends in the lengthwise direction (longest direction) of the test bar. The distance or height between the midpoint of the test bar in the lengthwise direction and the line created by the two ends of the test bar is the degree of curl in mm.

Procedure for Making Filaments

Filaments of examples C1-C7 were produced by feeding pellets of the semi-aromatic copolyamide and amorphous copolyamide described herein into a Werner & Pfleiderer 28 mm twin screw extruder equipped with a Zenith PEP-II melt pump. The barrel temperatures and melt pump temperature were set between 240-280° C. to achieve optimal filament quality depending on the specific polymer composition being used. The melt mixture coming out of the die was quenched in a water bath at a temperature between 5-60° C. to form a filament. The filament was moved by a strand puller at a rate to prevent breakage and wound into spools. Two diameters of filaments, 2.85 mm and 1.75 mm, were produced by adjusting the pulling rate.

Pellets of the polymer blend comprising semi-aromatic copolyamide and amorphous copolyamide as described in E1-E6 and E8-E20 were produced by melt compounding, where pellets of the semi-aromatic copolyamide and amorphous copolyamide were co-fed into a Werner & Pfleiderer 30 mm twin screw extruder at the weight ratios disclosed in Tables 1-4. The barrel temperatures were set between 240-280° C. to ensure melting and adequate mixing. The melt mixture was extruded through a die, quenched in a water bath at a temperature between 5-60° C., cut into pellets, and dried under vacuum with a stream of nitrogen purge at 90° C. for 12 hours for filament preparation.

Filaments for examples E1-E6, E8-E9, and E11-E18 were produced by feeding the dried pellets of the polymer blend comprising semi-aromatic copolyamide and amorphous copolyamide described herein into a Werner & Pfleiderer 28 mm twin screw extruder equipped with a Zenith PEP-II melt pump. The barrel temperatures and melt pump temperature were set between 240-280° C. to achieve optimal filament quality depending on the specific polymer composition being used. The melt mixture coming out of the die was quenched in a water bath at a temperature between 5-60° C. to form a filament. The filament was moved by a strand puller at a rate to prevent breakage and wound into spools. Two diameters of filaments, 2.85 mm and 1.75 mm, were produced by adjusting the pulling rate.

Filaments for examples E10, E19, and E20 were produced by feeding the dried pellets of the corresponding polymer blends into a 1.25 inch (32 mm) Brabender single screw extruder, optionally equipped with a Zenith PEP-II melt pump. The barrel temperatures were set between 240-280° C. to achieve optimal filament quality depending on the specific polymer composition being used. The melt mixture coming out of the die was quenched in a water bath at a temperature between 5-60° C. to form a filament. The filament was moved by a strand puller at a rate to prevent breakage and wound into spools. Two diameters of filaments, 2.85 mm and 1.75 mm, were produced by adjusting the pulling rate.

Filaments for examples E7 were produced by co-feeding pellets of the semi-aromatic copolyamide and amorphous copolyamide described herein into a Werner & Pfleiderer 28 mm twin screw extruder equipped with a Zenith PEP-II melt pump at the weight ratio disclosed in Tables 2. The barrel temperatures were set between 240-280° C. to achieve optimal filament quality depending on the specific polymer composition being used. The melt mixture coming out of the die was quenched in a water bath at a temperature between 5-60° C. to form a filament. The filament was moved by a strand puller at a rate to prevent breakage and wound into spools. Two diameters of filaments, 2.85 mm and 1.75 mm, were produced by adjusting the pulling rate.

These filaments were used to print 3D test bars used for examples E1-E20.

Fused Filament Fabrication Process

The following printers were used, as specified, for the examples described herein: (a) Lulzbot® Mini (Aleph Objects, Inc. (Loveland, Colo.) equipped with a standard direct-drive extruder and 0.5 mm nozzle and utilizing nominally 2.85 mm filament. (b) 3ntr A4v3 (3ntr, Oleggio, Italy; also available from Plural AM of Portland, Oreg.) equipped with two indirect drive and one direct drive extruder, all with 0.4 mm nozzles and utilizing nominally 2.85 mm filament. (c) Makergear M2 (Makergear, LLC; Beachwood, Ohio) equipped with a direct-drive extruder and 0.35 mm nozzle utilizing nominally 1.75 mm filament.

The examples and comparative examples in Tables 1-4 show the composition and physical properties of ISO test bars prepared according to ISO 527-2. These ISO test bars were printed by a fused filament fabrication process using a LulzBot® Mini (flat bar) or a 3ntr A4v3 (edge bar) 3D printer. All the examples and comparative examples were printed as a "flat bar" except E5 and E6 which were printed as "edge bars".

Comparative examples C1 to C3 are examples of semi-crystalline copolyamides in the absence of an amorphous copolyamide. Comparative example C4 is a mixture of the same semi-crystalline copolyamide and amorphous copolyamide as examples E1 to E3 except the weight ratio of semi-crystalline copolyamide to amorphous copolyamide is 50:50 for C4. C4 could not be processed into a filament for testing.

Relative strength compared to the control (RS vs. control (%)) as shown in Tables 1 and 2 for E1 to E3 used C1 as the control. Relative strength for E4 and E7 used C2 as the control and relative strength for E8 used C3 as the control. Since E5 and E6 were prepared as edge bars they were not compared to test bars prepared as flat bars as the results are not directly comparable.

The relative strength compared to the control, which does not comprise an amorphous copolyamide, for example E8 is at least 160 percent the relative strength of the control and for all other examples the relative strength is at least 500 percent the relative strength of the control. This is a surprising and unexpected increase in relative strength compared to articles which do not comprise an amorphous copolyamide.

All filaments used for preparing 3D printed articles in the examples and comparative examples were conditioned by drying the filament in a heated chamber or oven at 90° C. under a vacuum of 20-25 mm/Hg for 12 hours with a stream of nitrogen purge.

TABLE 1

|  | C1 | C2 | C3 | E1 | E2 | E3 | E4 | E5 | E6 |
|---|---|---|---|---|---|---|---|---|---|
| PA1 |  | 100 |  |  |  |  | 90 | 90 | 70 |
| PA2 | 100 |  |  | 90 | 80 | 70 |  |  |  |
| PA3 |  |  | 100 |  |  |  |  |  |  |
| PA4 |  |  |  | 10 | 20 | 30 | 10 | 10 | 30 |
| Bar type | flat | flat | flat | flat | flat | flat | flat | edge | edge |
| Physical Properties |  |  |  |  |  |  |  |  |  |
| Tensile Modulus (MPa) | 1492 | 1167 | 1106 | 1692 | 1605 | 1549 | 1540 | 1057 | 1245 |
| Relative Strength (psi) | 1772 | 1041 | 8212 | 9179 | 10079 | 10358 | 5251 | 7757 | 5748 |
| RS[1] vs control (%) |  |  |  | 518 | 568 | 584 | 504 |  |  |
| Relative Strength (MPa) | 12 | 7 | 57 | 63 | 69 | 71 | 36 | 53 | 40 |
| Tensile Stress (MPa) | 46 | 29 | 36 | 55 | 56 | 55 | 51 | 35 | 44 |
| Strain at Break (%) | 27 | 25 | 158 | 114 | 124 | 131 | 70 | 153 | 91 |
| HDT (° C.) | 149 | 99 | 116 | 131 | 119 | 113 | 101 | — | — |
| HD[2] (mm) | 12 | 13 | 13 | 1 | <1 | <1 | 1 | — | — |

[1]RS—Relative Strength
[2]Height Displacement

TABLE 2

|  | E7 | E8 | C4 |
|---|---|---|---|
| PA1 | 80 |  |  |
| PA2 |  |  | 50 |
| PA3 |  | 90 |  |
| PA4 | 20 | 10 | 50 |
| Bar type | flat | flat | flat |
| Physical Properties |  |  |  |
| Tensile Modulus (MPa) | 1410 | 1453 | No data[1] |
| Relative Strength (psi) | 6180 | 13169 | No data[1] |
| RS vs control (%) | 593 | 160 |  |
| Relative Strength (MPa) | 43 | 91 |  |
| Tensile Stress (MPa) | 49 | 52 |  |
| Strain at Break (%) | 86 | 176 |  |
| HDT (° C.) | — | — |  |
| HD[2] (mm) | 1 | 1 |  |

[1]No data - unable to make a filament
[2]Height Displacement

The curl bar test for examples C1 to C3, E1 to E4, E7, and E8 were printed using 3ntr A4v3 3D printer with a nozzle temperature of 265° C., bed temperature 85° C., and a chamber temperature 75° C. The curl bar test for example C8 and E20 were printed using Makergear M2 printer with a nozzle temperature of 290° C., bed temperature 85° C. under ambient environment (25° C.). In the case of semi-aromatic copolyamide alone without amorphous copolyamide, C1-C3, the height displacement of the curl bars is over 10 mm (Table 1), whereas the height displacement of the curl bars for the copolyamide comprising both semi-aromatic and amorphous copolyamide are 1 mm or less (Table 1 and 2). The height displacement for semi-aromatic copolyamide alone without amorphous copolyamide as exemplified in C8 is over 5 mm. The curl bar produced from C8 has significantly weaker interlayer adhesion as evidenced by the delamination of the layers as warpage progressing during printing. The height displacement would have been much higher than 5 mm if the interlayer adhesion were strong to prevent the delamination during printing. Compared to comparative example C8, curl bar printed from example E20 showed a height displacement of 1 mm. Low warpage, as evidenced by the low height displacement in the curl bar test, is a clear benefit of the improved polymer compositions, especially when printing large parts using fused filament fabrication.

For all the examples and comparative examples in Table 3 and 4, the bed temperature of the 3D printing device was at 25° C. Relative strength compared to the control (RS vs. control (%)) as shown in Tables 3 and 4 for E9 and E10 used C5 as the control. Relative strength for E11 to E13 used C6 as the control; relative strength for E14 to E19 used C7 as the control; and relative strength for E20 used C8 as control.

TABLE 3

|  | C5 | E9 | E10 | C6 | E11 | E12 | E13 |
|---|---|---|---|---|---|---|---|
| PA1 |  |  |  | 100 | 90 | 80 | 70 |
| PA2 | 100 | 80 | 60 |  |  |  |  |
| PA3 |  |  |  |  |  |  |  |
| PA4 |  | 20 | 40 |  | 10 | 20 | 30 |
| PA5 |  |  |  |  |  |  |  |
| PA6 |  |  |  |  |  |  |  |

TABLE 3-continued

|  | C5 | E9 | E10 | C6 | E11 | E12 | E13 |
|---|---|---|---|---|---|---|---|
| Bar type | Flat | Flat | Flat | Flat | Flat | Flat | Flat |
| Tensile Modulus (MPa) | 1801 | 1678 | 1732 | 1605 | 1365 | 1572 | 1615 |
| Relative Strength (psi) | 912 | 6062 | 5302 | 7195 | 12011 | 10900 | 10092 |
| Relative Strength (MPa) | 6 | 42 | 37 | 50 | 83 | 75 | 70 |
| RS vs control (%) | — | 665 | 581 | — | 167 | 151 | 140 |
| Tensile Stress (MPa) | 51 | 54 | 60 | 53 | 45 | 51 | 52 |
| Strain at Break (%) | 12 | 77 | 61 | 94 | 183 | 147 | 134 |
| HDT (° C.) |  | 107 |  | 108 |  |  |  |
| HD (mm) |  |  |  |  |  |  |  |

The results in Table 3 and 4 show that the improvement in relative strength of test samples prepared at a bed temperature of 25° C., verses a bed temperature of 85° C. for the samples in Tables 1 and 2, remains superior to the controls. Examples E11 to E13, when compared to the control (C6), show an improvement in relative strength of at least 140 percent. For E9 vs. C5 the improvement in relative strength is over 500 percent.

TABLE 4

|  | C7 | E14 | E15 | E16 | E17 | E18 | E19 | C8 | E20 |
|---|---|---|---|---|---|---|---|---|---|
| PA1 |  |  |  |  |  |  |  |  |  |
| PA2 |  |  |  |  |  |  |  |  |  |
| PA3 | 100 | 90 | 85 | 80 | 80 | 70 | 60 |  |  |
| PA4 |  | 10 | 15 | 20 | 20 | 30 | 40 |  | 30 |
| PA5 |  |  |  |  |  |  |  |  |  |
| PA6 |  |  |  |  |  |  |  | 100 | 70 |
| Bar type | Flat | Flat | Flat | Flat | Flat | Flat | Flat | Flat | Flat |
| Tensile Modulus (MPa) | 1727 | 1611 | 1838 | 1508 | 1549 | 1656 | 1977 | 2118 | 2118 |
| Relative Strength (psi) | 943 | 9023 | 12416 | 10105 | 11927 | 5967 | 6731 | 62 | 486 |
| Relative Strength (MPa) | 7 | 62 | 86 | 70 | 82 | 41 | 46 | 0.4 | 3 |
| RS vs control (%) | — | 957 | 1317 | 1072 | 1265 | 633 | 714 | — | 784 |
| Tensile Stress (MPa) | 60 | 57 | 63 | 52 | 56 | 58 | 75 | 27 | 70 |
| Strain at Break (%) | 11 | 110 | 135 | 133 | 147 | 71 | 62 | 1.57 | 4.77 |
| HDT (° C.) |  |  |  |  |  |  |  |  |  |
| HD (mm) |  |  |  |  |  |  |  | >5* | 1 |

*Due to poor interlayer adhesion and delamination of the layers, the actual height displacement for the curl bar is greater than the measured value.

The invention claimed is:

1. A filament comprising a polymer composition, said polymer composition consisting of:
A) 55 to 95 weight percent semi-aromatic copolyamide having a melting point; wherein said semi-aromatic copolyamide consists of
a-1) 5 to 40 mole percent aromatic repeat units derived from:
i) terephthalic acid and hexamethylenediamine; and
a-2) 60 to 95 mole percent aliphatic repeat units derived from:

ii) adipic acid, decanedioic acid, dodecanedioic acid, tetradecanedioic acid, hexadecanedioic acid, or octadecanedioic acid and hexamethylenediamine;

B) 5 to 45 weight percent amorphous copolyamide having a melting point; wherein said amorphous copolyamide comprises b-1) 60 to 90 mole percent aromatic repeat units derived from:
iii) isophthalic acid and an aliphatic diamine with 4 to 20 carbon atoms; and b-2) 10 to 40 mole percent aromatic repeat units derived from:
iv) terephthalic acid and an aliphatic diamine with 4 to 20 carbon atoms; and optionally C) one or more additives selected from the group consisting of plasticizers, colorants, lubricants, antioxidants, and heat stabilizers; wherein the weight percentages are based on the sum of the weights of the semi-aromatic copolyamide and the amorphous copolyamide; and the mole percentages are based on the total number of moles of repeat units in the semi-aromatic copolyamide or in the amorphous copolyamide.

2. The filament of claim 1 wherein the amorphous copolyamide is PA 6I/6T.

3. The filament of claim 1 wherein said polymer composition consists of 60 to 95 weight percent semi-aromatic copolyamide (A), 5 to 40 weight percent amorphous copolyamide (B), and optionally one or more additives (C) selected from the group consisting of plasticizers, colorants, lubricants, antioxidants, and heat stabilizers.

4. The filament of claim 1 wherein said polymer composition consists of 65 to 90 weight percent semi-aromatic copolyamide (A), 5 to 35 weight percent amorphous copolyamide (B), and optionally one or more additives (C) selected from the group consisting of plasticizers, colorants, lubricants, antioxidants, and heat stabilizers.

5. The filament of claim 1 wherein the mole percent of aromatic repeat units (a-1) is from 10 to 30 mole percent and the mole percent of aliphatic repeat units (a-2) is from 70 to 90 mole percent.

6. The filament of claim 1 wherein the mole percent of aromatic repeat units (b-1) is from 70 to 90 mole percent and the mole percent of aromatic repeat units (b-2) is from 10 to 30 mole percent.

7. An article printed from the filament of claim 1 using a fused filament fabrication process.

8. The article of claim 7, which, when printed in the shape of ISO 527-2 test bars, exhibits a relative strength which is at least 140 percent of the relative strength of an otherwise identical article printed from a second filament comprising a second polymer composition, wherein said second polymer composition comprises the semi-aromatic copolyamide (A) and any additives contained in the composition of claim 1, and further wherein said second polymer composition does not comprise the amorphous copolyamide (B).

9. The article of claim 7, when printed in the shape of test bars having dimensions of 270 mm length, 10 mm width, and 10 mm height, exhibits a height displacement less than 2 mm when measured according to the Curl Bar Test.

10. The article of claim 7, when printed in the shape of test bars having dimensions of 270 mm length, 10 mm width, and 10 mm height, exhibits a height displacement less than 1 mm when measured according to the Curl Bar Test.

11. The filament of claim 1 wherein the semi-aromatic copolyamide consists of
a-1) 15 to 25 mole percent aromatic repeat units; and
a-2) 75 to 85 mole percent aliphatic repeat units.

\* \* \* \* \*